United States Patent
Sampath

(10) Patent No.: US 7,149,254 B2
(45) Date of Patent: Dec. 12, 2006

(54) TRANSMIT SIGNAL PREPROCESSING BASED ON TRANSMIT ANTENNAE CORRELATIONS FOR MULTIPLE ANTENNAE SYSTEMS

(75) Inventor: Hemanth Sampath, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 09/948,204

(22) Filed: Sep. 6, 2001

(65) Prior Publication Data

US 2003/0043929 A1    Mar. 6, 2003

(51) Int. Cl.
  *H04B 7/02* (2006.01)
(52) U.S. Cl. ...................................... 375/267; 375/296
(58) Field of Classification Search ................. 375/267, 375/259, 260, 146, 295, 296
  See application file for complete search history.

(56) References Cited

U.S. PATENT DOCUMENTS

| | | | |
|---|---|---|---|
| 4,347,627 A | 8/1982 | Alter | |
| 4,554,552 A | 11/1985 | Alford et al. | |
| 5,136,528 A | 8/1992 | Fordham et al. | |
| 5,345,599 A | 9/1994 | Paulraj et al. | |
| 5,361,276 A | 11/1994 | Subrmanian | |
| 5,504,936 A | 4/1996 | Lee | |
| 5,515,378 A | 5/1996 | Roy et al. | |
| 5,535,242 A | 7/1996 | Bridida et al. | |
| 5,559,810 A | 9/1996 | Gilbert et al. | |
| 5,592,471 A | 1/1997 | Briskman | |
| 5,592,490 A | 1/1997 | Barratt et al. | |
| 5,608,765 A | 3/1997 | Tanoue | |
| 5,627,861 A | 5/1997 | Kataoka et al. | |
| 5,642,353 A | 6/1997 | Roy et al. | |
| 5,715,240 A | 2/1998 | Borras et al. | |
| 5,721,733 A | 2/1998 | Wang et al. | |
| 5,729,825 A | 3/1998 | Kostreski et al. | |
| 5,732,075 A | 3/1998 | Tangemann et al. | |
| 5,752,193 A | 5/1998 | Scholefield et al. | |
| 5,781,583 A | 7/1998 | Bruckert et al. | |
| 5,815,488 A | 9/1998 | Williams et al. | |

(Continued)

FOREIGN PATENT DOCUMENTS

EP    1 185 001    3/2002

(Continued)

OTHER PUBLICATIONS

Raleigh et al., Spatio-Temporal Coding for Wireless Communication, Mar. 1998, IEEE Transactions on Communications.

(Continued)

*Primary Examiner*—Kevin Burd
(74) *Attorney, Agent, or Firm*—Michael A. Proksch

(57) ABSTRACT

The present invention provides a method and system for preprocessing transmit signals in spatial multiplexing and diversity systems that include multiple transmit antennae. The method includes generating a representative correlation matrix based upon estimates of a correlation between each pair of the plurality of antennae. An equivalent eigenvalue decomposition of the representative correlation matrix is determined. A preprocessing matrix based upon the equivalent eigenvalue decomposition is generated. Finally, a preprocessor preprocesses the transmit signals by multiplying blocks of data of the transmit signals with the preprocessing matrix. The representative correlation matrix can be an exact estimate of the correlation between each pair of the multiple antennae, or the representative correlation matrix can be an approximate estimate of the correlation between each pair of the multiple antennae.

25 Claims, 10 Drawing Sheets

U.S. PATENT DOCUMENTS

| | | | |
|---|---|---|---|
| 5,819,168 | A | 10/1998 | Golden et al. |
| 5,828,658 | A | 10/1998 | Ottersten et al. |
| 5,832,044 | A | 11/1998 | Sousa et al. |
| 5,841,971 | A | 11/1998 | Longginou et al. |
| 5,867,478 | A | 2/1999 | Baum |
| 5,886,988 | A | 3/1999 | Yun et al. |
| 5,889,759 | A | 3/1999 | McGibney |
| 5,894,598 | A | 4/1999 | Shoki |
| 5,901,354 | A | 5/1999 | Menich et al. |
| 5,923,650 | A | 7/1999 | Chen et al. |
| 5,933,421 | A | 8/1999 | Alamouti et al. |
| 5,936,949 | A | 8/1999 | Pasternak et al. |
| 5,940,771 | A | 8/1999 | Gollnick et al. |
| 5,999,800 | A | 12/1999 | Choi et al. |
| 6,021,124 | A | 2/2000 | Haartsen et al. |
| 6,049,543 | A | 4/2000 | Sauer et al. |
| 6,058,105 | A | 5/2000 | Hochwald et al. |
| 6,058,114 | A | 5/2000 | Sethuram et al. |
| 6,064,662 | A | 5/2000 | Gitlin et al. |
| 6,067,290 | A | 5/2000 | Paulraj et al. |
| 6,069,883 | A | 5/2000 | Ejzak et al. |
| 6,081,566 | A | 6/2000 | Molnar et al. |
| 6,097,704 | A | 8/2000 | Jackson et al. |
| 6,097,771 | A | 8/2000 | Foschini |
| 6,108,565 | A | 8/2000 | Scherzer |
| 6,144,711 | A | 11/2000 | Raleigh et al. |
| 6,154,661 | A | 11/2000 | Goldburg |
| 6,163,547 | A | 12/2000 | De Vriendt et al. |
| 6,175,550 | B1 | 1/2001 | Van Nee |
| 6,185,258 | B1 | 2/2001 | Alamouti |
| 6,185,440 | B1 | 2/2001 | Barratt et al. |
| 6,192,026 | B1 | 2/2001 | Pollack et al. |
| 6,198,775 | B1 | 3/2001 | Khayrallah et al. |
| 6,243,367 | B1 | 6/2001 | Hussain |
| 6,249,669 | B1 | 6/2001 | Ogino et al. |
| 6,266,527 | B1 | 7/2001 | Mintz |
| 6,278,697 | B1 | 8/2001 | Brody et al. |
| 6,317,420 | B1 | 11/2001 | Schiff |
| 6,317,435 | B1 | 11/2001 | Tiedemann |
| 6,317,466 | B1 | 11/2001 | Foschini et al. |
| 6,351,499 | B1 | 2/2002 | Paulraj et al. |
| 6,370,129 | B1 | 4/2002 | Huang |
| 6,400,699 | B1 | 6/2002 | Airy et al. |
| 6,411,824 | B1 | 6/2002 | Eidson |
| 6,441,721 | B1 | 8/2002 | Tajima et al. |
| 6,452,981 | B1 | 9/2002 | Raleigh et al. |
| 6,473,399 | B1 | 10/2002 | Johansson et al. |
| 6,473,467 | B1 | 10/2002 | Wallace |
| 6,490,256 | B1 | 12/2002 | Jones et al. |
| 6,507,605 | B1 | 1/2003 | Fukumoto et al. |
| 6,535,497 | B1 | 3/2003 | Raith |
| 6,563,790 | B1 | 5/2003 | Yu et al. |
| 6,583,400 | B1 | 6/2003 | Miyoshi |
| 6,650,878 | B1 | 11/2003 | Abe et al. |
| 6,714,514 | B1 | 3/2004 | Espax et al. |
| 6,757,241 | B1 | 6/2004 | Jones et al. |
| 6,763,491 | B1 | 7/2004 | McDonnell |
| 6,778,501 | B1 | 8/2004 | Malmgren et al. |
| 6,802,035 | B1 | 10/2004 | Catreux et al. |
| 6,842,487 | B1 | 1/2005 | Larsson |
| 6,850,481 | B1 | 2/2005 | Wu et al. |
| 6,888,809 | B1 | 5/2005 | Foschini et al. |
| 2001/0003088 | A1 | 6/2001 | Ogino et al. |
| 2001/0022867 | A1 | 10/2001 | Wang et al. |
| 2002/0000948 | A1* | 1/2002 | Chun et al. ................. 343/853 |
| 2002/0071407 | A1 | 6/2002 | Koo et al. |
| 2002/0097684 | A1 | 7/2002 | Da et al. |
| 2003/0035490 | A1* | 2/2003 | Gollamudi .................. 375/267 |
| 2003/0147353 | A1 | 8/2003 | Clarkson et al. |

FOREIGN PATENT DOCUMENTS

| | | |
|---|---|---|
| WO | WO 96/22662 | 7/1996 |
| WO | WO 98/34424 | 8/1996 |
| WO | WO 98/09381 | 3/1998 |
| WO | WO 98/09385 | 3/1998 |
| WO | WO 00/79722 | 12/2000 |

OTHER PUBLICATIONS

Ardavan Maleki et al., Space-Time Coding and Transmission Opimization for Wireless Channels, Jul. 1998, IEEE.

Ann Scaglione et al., Filterbank Transceivers Optimization Information Rate in Block Transmission over Dispersive Channels, Apr. 1999, IEEE.

Ann Scaglione et al., Redundant Filterbank Precoders and Equilizers Part I: Unification and Optimal Designs, Jul. 1999, IEEE Transactions on Signal Processing.

Rohit Negi et al., Adaptive Antennas for Space-Time Coding Over Block-Time Invariant Multi-Path Fading Channels, 1999, IEEE.

Da-Shan Shiu et al., Fading Correlation and Its Effect on the Capacity of Multielement Antenna Systems, Mar. 2000, IEEE Transactions on Communications.

Helmut Bolcskei et al., Performance of Space-Time Codes in the Presence of Spatial Fading Correlation, 2000, IEEE.

Hemanth Sampath et al., Generalized linear precoder and decoder design for MIMO channels using the weighted MMSE criterion.

Paulraj, A. et al., "Space-Time Processing for Wireless Communications", IEEE Signal Processing Magazine, Nov. 1997, pp. 49-83.

Paulraj, A., "Taxonomy of Space-Time Processing for Wireless Networks", IEEE Proc.—Radar Sonar Navig., vol. 145, No. 1 Feb. 1998.

Andrews, M. et al., "Tripping the Capacity of Wireless Communications using Electromagnetic Polarization", Nature Magazine, Jan. 18, 2001, pp. 316-318, vol. 409, Macmillian Magazine.

Bertoni, Henry L., "Talk is cheap in the City", Nature Magazine, Jan. 18, 2001, pp. 291-292, vol. 409, Macmillian Magazines.

Raliegh et al., "Spatio-Temporal Coding for Wireless Communication", Mar. 1998, IEEE Transactions on Communications.

A. Maleki et al., "Space-Time Coding Transmission Optimization for Wireless Channels" Jul. 1998, IEEE.

A. Scaglione et al., "Filterbank Transceivers Optimization Information Rate in Block Transmission over Drepssive Channnels", Apr. 1999, IEEE.

A.Scaglione et al., Redundant Filterbank Precoders and Equalizers Part 1: Unification and Optimal Designs, Jul. 1999 Transactions on Signal Processing.

R. Negi et al., Adaptive Antennas for Space-Time Coding over Block-Time Invariant Multi-Path Fading Channels, 1999, IEEE.

D. Shiu et al., Fading Correlation and Its Effects on the Capacity of the Multielement Antenna Systems, IEEE Transactions on Communications, vol. 48, No. 3, Mar. 2000.

H. Bolcskei et al., Performance of Space-Time Codes in the Presence of Spatial Fading Correlation, IEEE, 2000.

H. Sampath et al. Generalized Linear Precoder and Decoder Design for MIMO Channels using the Weighted MMSE Criterion, IEEE Transactions on Communications, vol. XX, No. Y, 2001.

* cited by examiner

US 7,149,254 B2

TRANSMIT SIGNAL PREPROCESSING BASED ON TRANSMIT ANTENNAE CORRELATIONS FOR MULTIPLE ANTENNAE SYSTEMS

FIELD OF THE INVENTION

The invention relates generally to wireless communications. More particularly, the invention relates to a system and method for preprocessing transmit signals based upon a correlation between transmit signals of multiple transmit antenna systems.

BACKGROUND OF THE INVENTION

Wireless communication systems commonly include information-carrying modulated carrier signals that are wirelessly transmitted from a transmission source (for example, a base transceiver station) to one or more receivers (for example, subscriber units) within an area or region.

A form of wireless communication includes multiple transmit antennae and multiple receiver antennae. Multiple antennae communication systems can support communication diversity and spatial multiplexing.

A Wireless Channel

FIG. 1 shows modulated carrier signals traveling from a transmitter 110 to a receiver 120 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. For example, if three antennae are used at the transmitter (base transceiver station) and the receiver (subscriber unit), the stream of possibly coded information symbols is split into three independent substreams. These substreams occupy the same channel of a multiple access protocol. Possible same channel multiple access protocols include a same time slot in a time-division multiple access protocol, a same frequency slot in frequency-division multiple access protocol, a same code sequence in code-division multiple access protocol or a same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the receiver array, a spatial signature of each of the received signals is estimated. Based on the spatial signatures, a signal processing technique is applied to separate the signals, recovering the original substreams.

FIG. 2 shows three transmitter antenna arrays 210, 220, 230 that transmit data symbols to a receiver antenna array 240. Each transmitter antenna array and each receiver antenna array include spatially separate antennae. A receiver connected to the receiver antenna array 240 separates the received signals.

Multiple antenna systems employ spatial multiplexing to improve data rates. In such schemes, multiple transmit signals are sent over separate antennas to obtain a linear increase in data rates. Spatial multiplexing schemes require no channel knowledge at the transmitter, but suffer performance loss in poor transmission quality channels. Poor transmission quality channels include properties that null out or attenuate some elements of the transmit signals. As a result, the receiver receives a badly distorted copy of the transmit signal and suffer performance loss. There is a need for additional transmit preprocessing schemes that assume channel knowledge and mitigate performance loss in poor transmission quality channels.

Communication Diversity

Antenna diversity is a technique used in multiple antenna-based communication system to reduce the effects of multipath fading. Antenna diversity can be obtained by providing a transmitter and/or a receiver with two or more antennae. Each transmit and receive antenna pair include a transmission channel. The transmission channels fade in a statistically independent manner. Therefore, when one transmission channel is fading due to the destructive effects of multi-path interference, another of the transmission channels is unlikely to be suffering from fading simultaneously. By virtue of the redundancy provided by these independent transmission channels, a receiver can often reduce the detrimental effects of fading.

Multiple antennae systems typically employ antenna diversity to mitigate fading and ensure a robust communication link. Antenna diversity can be of two types—transmit diversity and receive diversity. Receive diversity is well known and involves combining signals from multiple receive antennae to mitigate fading. Receive diversity schemes require channel knowledge at the receiver. A method for obtaining transmission channel knowledge includes the transmitter sends known training sequences through the wireless transmission channel. The receiver estimates the transmission channel by comparing the received sequence with the known transmit sequence.

Transmit diversity is a relatively recent technology and involves sending multiple copies of the transmit signal on different transmit antennae. These multiple copies are typically include linear or non-linear mappings of the original transmit signal. Space-time coding is a powerful transmit diversity scheme that can be used to improve system performance. Transmit diversity schemes require no channel knowledge at the transmitter, but suffer performance loss in poor transmission quality channels. Poor transmission quality channels include certain properties that null out or attenuate some elements of the transmit signals. As a result, the receiver receives a badly distorted copy of the transmit signal and suffer performance loss. It is desirable to have transmitter schemes that can operate in poor transmission quality channels. Typically, such schemes require some channel knowledge at the transmitter.

Preprocessing

In some applications, channel knowledge is available at the transmitter. Channel knowledge at the transmitter can be acquired by receiving channel information from the receiver, or by the transmitter directly estimating channel information. In frequency division duplex (FDD) systems, a feedback link can be used to send channel information from the receiver to the transmitter. That is, the receiver estimates the channel through channel training, and feeds the resulting channel information back to the transmitter. In time division duplex (TDD) systems, transmission and reception from both the transmitter and the receiver occurs at the same transmission frequency. That is, both the transmitter and the receiver are actually transceivers that transmit and receive information to and from each other at approximately the same frequency range. Therefore, the transmitter can estimate the channel through training of signals transmitted from the receiver. The estimated channel can be calculated at the transmitter, and used for preprocessing signals to be transmitted.

When channel knowledge is available at the transmitter, channel dependent preprocessing of transmit signals can be employed to improve system performance. The channel dependent preprocessing is typically accomplished by a precoder or a pre-processer that is located within the transmitter. The precoder linearly or non-linearly maps the transmit signals on to the multiple transmit antennae to improve system performance. The precoder can be used in conjunction with or in lieu of existing diversity and multiplexing schemes.

The prior art includes several linear precoder schemes that rely on perfect channel knowledge at the transmitter. However, in wireless transmission systems, perfect channel knowledge can hard to obtain due to a number of reasons. For example, in an FDD system, the feedback link might be slower than the coherence time. That is, the channel may change before the transmitter receives feedback from the receiver. In this situation, the prior art precoding schemes suffer performance loss and are not useful.

It is desirable to have a method and system that include preprocessing of transmit signals in multiple transmit antennae systems that does not require perfect transmission channel knowledge. The method and system should be operational in existing diversity and spatial multiplexing systems, and should be able to account for transmission channels having slowly varying transmission channel characteristics.

SUMMARY OF THE INVENTION

The invention includes a method and system for preprocessing transmit signals in spatial multiplexing and diversity systems that include multiple transmit antennae. The preprocessing does not require perfect transmission channel at the transmitter. The processing uses correlation information between signals received from the multiple transmit antennae. The method and system can be utilized in conjunction with spatial multiplexing and diversity systems to provide improved system performance.

A first embodiment of the invention includes a method for preprocessing transmit signals of a transmitter having a plurality of antennae. The method includes generating a representative correlation matrix based upon estimates of a correlation between each pair of the plurality of antennae. An equivalent eigenvalue decomposition of the representative correlation matrix is determined. A preprocessing matrix based upon the equivalent eigenvalue decomposition is generated. Finally, a preprocessor preprocesses the transmit signals by multiplying blocks of data of the transmit signals with the preprocessing matrix. The representative correlation matrix can be an exact estimate of the correlation between each pair of the multiple antennae, or the representative correlation matrix can be an approximate estimate of the correlation between each pair of the multiple antennae. The representative correlation matrix can be based upon a mean estimate and/or a covariance estimate of a channel matrix that represents a transmission channel between the plurality of antennae and a receiver.

A second embodiment is similar to the first embodiment. The second embodiment further includes generating an eigenvector from the representative correlation matrix. For this embodiment generating a preprocessing matrix includes multiplying the eigenvector with a scaler.

A third embodiment is similar to the first embodiment. The third embodiment, further includes selecting a number B largest eigenvectors of the representative correlation matrix, where B is a number of data streams received by the preprocessor. An orthogonal matrix is generated from the B largest eigenvectors. For this embodiment, generating a preprocessing matrix includes multiplying the orthogonal matrix with a scaling matrix. The data streams received by the preprocessor can be generated by a space/time processor. The space/time processor can include spatial multiplexing.

A fourth embodiment is similar to the first embodiment. The fourth embodiment, further includes selecting a number B largest correlation eigenvectors of the representative correlation matrix, where B is a number of data streams received by the preprocessor. A first orthogonal matrix is generated from the B largest eigenvectors. A minimum distance error matrix is generated from a space/time processor that generates the data streams. A number B largest minimum distance eigenvectors is selected from the minimum distance error matrix. A second orthogonal matrix is generated from the B largest minimum distance eigenvectors. For this embodiment, generating a preprocessing matrix includes multiplying the first orthogonal matrix with a scaler matrix and the second orthogonal matrix. The data streams received by the preprocessor can be generated by a space/time processor. The space/time processor can include transmission diversity.

A fifth embodiment is similar to the first embodiment. The fifth embodiment, further includes the preprocessed transmit signals being modulated with a multi-carrier modulator. The multi-carrier modulator can include an orthogonal frequency division multiplexer. This embodiment can include multiple preprocessors, wherein a preprocessor corresponds with at least one of each of a plurality carrier signals of the multi-carrier modulator.

A sixth embodiment of the invention includes a system for preprocessing signals to be transmitted from a transmitter having multiple antennae, to a receiver for receiving the preprocessed signals. The system includes a means for generating a representative correlation matrix based upon estimates of a correlation between signal transmitted from each pair of the multiple antennae, a means for determining an equivalent eigenvalue decomposition of the representative correlation matrix, a means for generating a preprocessing matrix based upon the equivalent eigenvalue decomposition, and a preprocessor for preprocessing the transmit signals by multiplying blocks of data of the transmit signals with the preprocessing matrix.

Other aspects and advantages of the present invention will become apparent from the following detailed description, taken in conjunction with the accompanying drawings, illustrating by way of example the principles of the invention.

DETAILED DESCRIPTION

Figure 1:
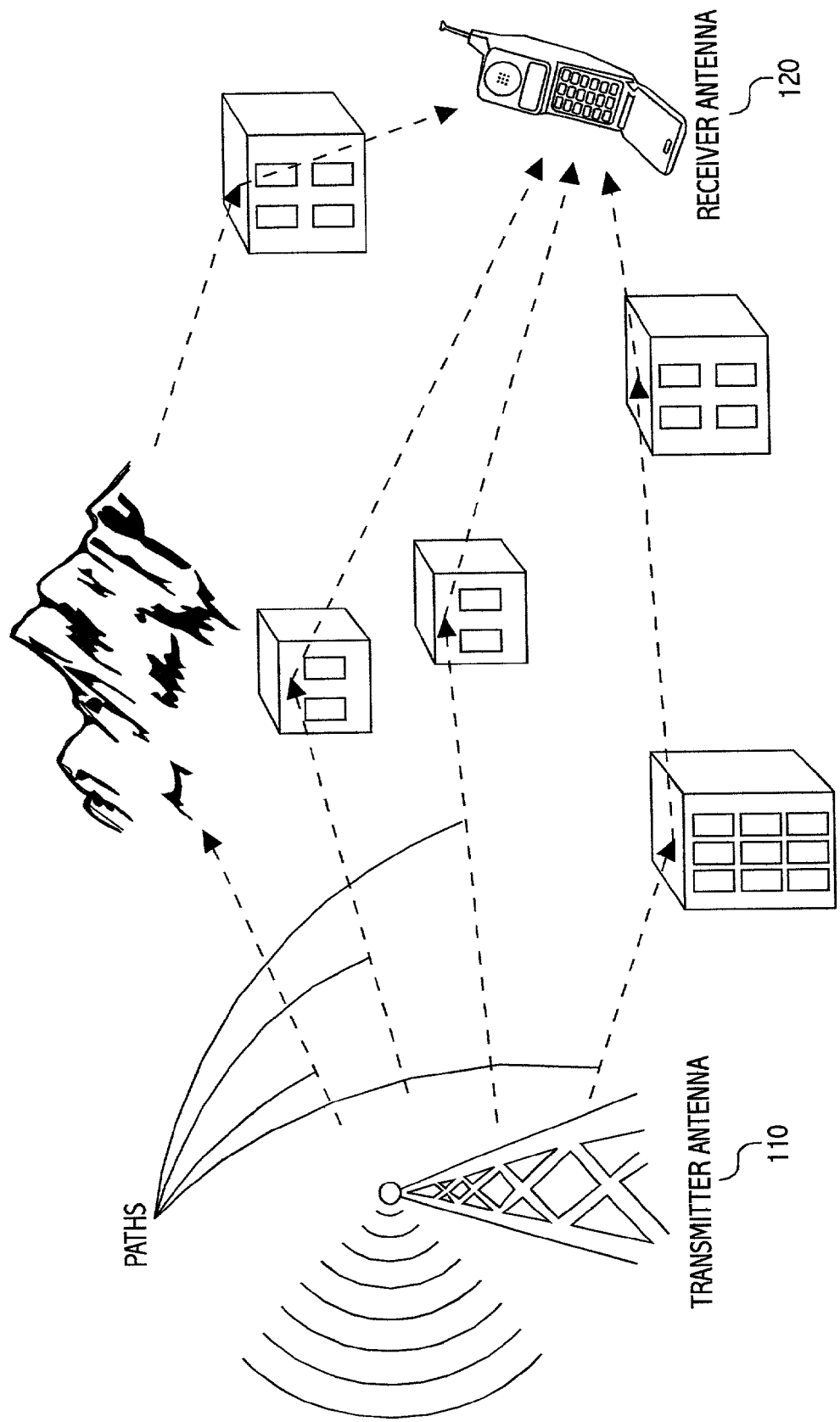
FIG. 1 shows a prior art wireless system that includes multiple paths from a system transmitter to a system receiver.
Figure 2:
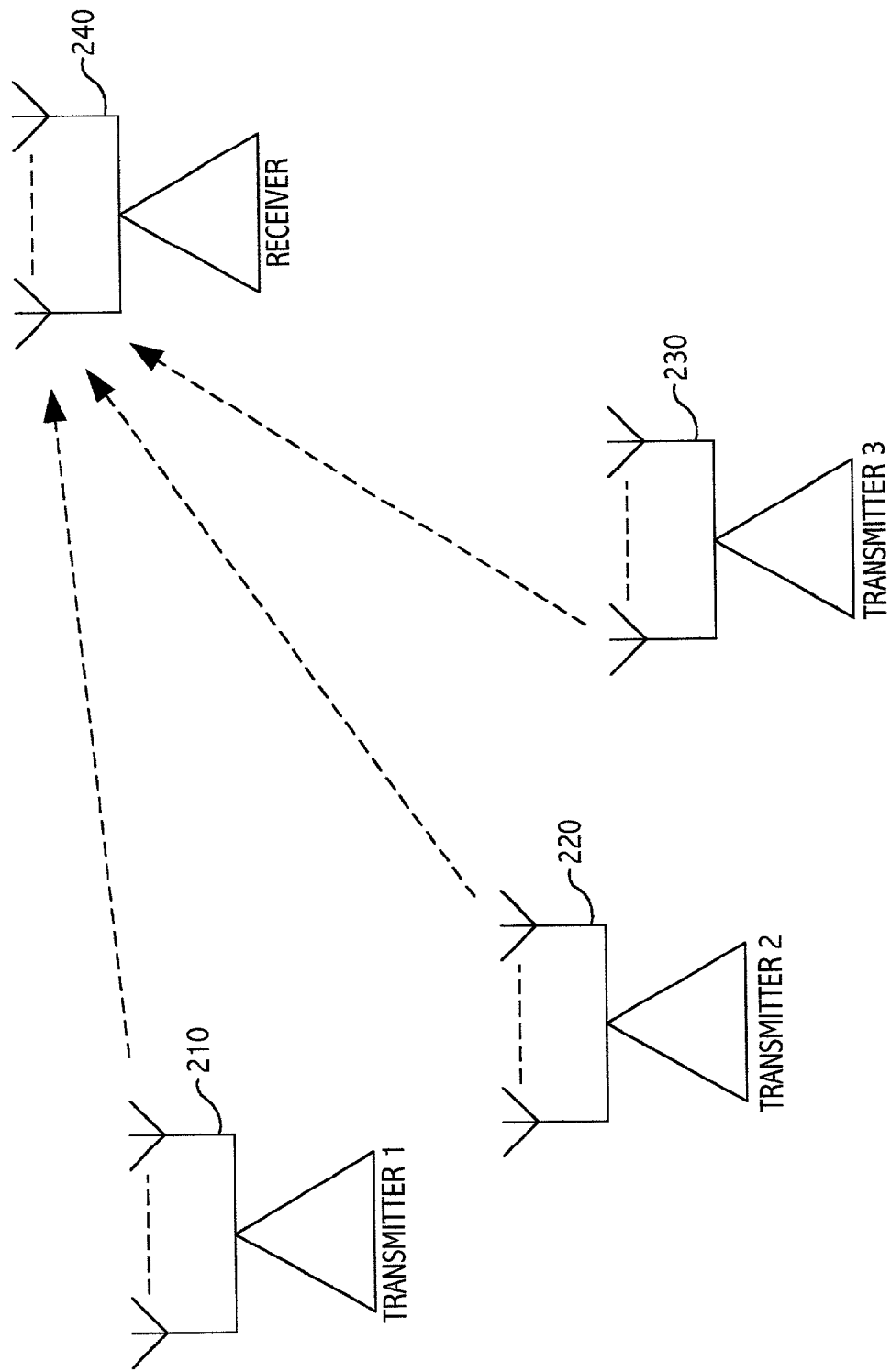
FIG. 2 shows a prior art wireless system that includes spatially separate transmitter antennae and spatially separate receiver antennae.

As shown in the drawings for purposes of illustration, the invention is embodied in an method and system for preprocessing transmit signals in spatial multiplexing and diversity systems that include multiple transmit antennae. The preprocessing does not require perfect transmission channel at the transmitter. The processing uses information regarding correlation between signals transmitted from the multiple transmit antennae. The method and system can be utilized in conjunction with spatial multiplexing and diversity systems to provide improved system performance.

Particular embodiments of the present invention will now be described in detail with reference to the drawing figures. The techniques of the present invention may be implemented in various different types of wireless communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. Subscribers may be mobile or fixed. Exemplary subscribers include devices such as portable telephones, car phones, and stationary receivers such as a wireless modem at a fixed location.

The base station is preferably provided with multiple antennas that allow antenna diversity techniques and/or spatial multiplexing techniques. In addition, each subscriber is preferably equipped with multiple antennas that permit further spatial multiplexing and/or antenna diversity. Multiple Input Single Output (MISO) or Multiple Input Multiple Output (MIMO) configurations are both possible. In either of these configurations, the communications techniques can employ single-carrier or multi-carrier communications techniques. Although the techniques of the present invention apply to point-to-multipoint systems, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Point-to-multipoint applications of the invention can include various types of multiple access schemes. Such schemes include, but are not limited to, time division multiple access (TDMA), frequency division multiple access (FDMA), code division multiple access (CDMA), orthogonal frequency division multiple access (OFDMA) and wavelet division multiple access.

The transmission can be time division duplex (TDD). That is, the downlink transmission can occupy the same channel (same transmission frequency) as the uplink transmission, but occur at different times. Alternatively, the transmission can be frequency division duplex (FDD). That is, the downlink transmission can be at a different frequency than the uplink transmission. FDD allows downlink transmission and uplink transmission to occur simultaneously.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) causes variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

Some channel parameters of a wireless channel vary more slowly than other channel parameters. For example, statistics of the wireless channel including the mean and correlation of the channel elements typically vary slowly. These parameters can be estimated at the receiver and feedback to the transmitter with high accuracy. The invention includes using these slowly varying channel parameters to improve system performance through preprocessing of signals before transmission. The preprocessing can be used in conjunction with or in lieu of existing transmit diversity and spatial multiplexing schemes to improve system performance.

The prior art includes preprocessing techniques that requires the transmitter to track the channel perfectly. In FDD systems, this can be made possible through a feedback link. The receiver feeds back the estimated channel to the transmitter. In TDD systems, the transmitter can estimate the channel when the transmitter is in the receiver mode. Practically, tracking the channel accurately at the transmitter is difficult due to channel estimation errors, time-varying nature of the wireless channel, slow feedback link. Therefore, prior art systems are difficult to implement in wireless systems.

The invention includes a preprocessing technique that improves system performance without requiring perfect channel knowledge at the transmitter. The processing uses correlation information between signals transmitted from the multiple transmit antennae. More precisely, a transmit antenna correlation matrix. The correlation matrix includes properties such as the mean and covariance of the channel (also known as the first and second order statistics of the channel). These properties vary slowly over time, and can easily be estimated (as will be explained later). The method and system can be utilized in lieu of or in conjunction with existing multiple antenna techniques such as spatial multiplexing and transmit diversity to provide improved system performance.

For channels with negligible delay spread, the transmission channel can be represented by an M by N matrix H, where M is the number of transmit antennas and N is the number of receiver antennas. A correlation matrix R of transmit antennae pair can be represented by $R = \text{mean}(H^* * H)$, where $H^*$ is the conjugate transpose of H. The mean of $H^* * H$ is an average over many realizations, depending on system implementation issues. The number of realization is small when a fast-feedback scheme is available or when the channel realizations are tracked at a fast rate.

For channels with significant delay-spread, typically orthogonal frequency division multiplexing (OFDM) modulation system (as will be described later) is employed. In an OFDM system that includes multiple frequency tones, the delay spread results in each frequency tone having a different fade. The correlation matrix R can now be estimated for each tone. For each tone i, a corresponding correlation matrix Ri can be represented by $Ri = \text{mean}(Hi^* * Hi)$.

As explained before, the above processing can be done at the transmitter or the receiver, depending on whether we have a TDD or an FDD system. Note also, that the estimation of correlation matrix is well known in the art of communications and signal processing. One way of estimating the correlation matrix is provided here.

In general, if the correlation between any two transmitter antennae pair j, i can be denoted ,
ρ
then the antennae correlation matrix R can be formed for the M transmit antennae.

$$R = \begin{bmatrix} 1 & \rho_{12} & \rho_{13} & \cdots & \rho_{1n} \\ \rho_{12} & 1 & \rho_{23} & & \\ \rho_{13} & \rho_{23} & & & \\ \vdots & & & 1 & \\ \rho_{1n} & \cdots & & & 1 \end{bmatrix}$$

The antenna correlation is primarily dependent on the channel multipath and antenna separation.

Channel Multipath

For a given antenna separation, the antenna correlation is approximately inversely proportional to the number of multipaths. If there is a large amount of multipath, the channel element (within the corresponding channel matrix H) between each transmit-receive antenna pair includes a random amplitude and phase due to the constructive/destructive interference of the independent multipaths. The channel elements between different transmit-receive pairs are uncorrelated (more independent), when there is a large amount of multipath. However, if the wireless channel has only a few dominant multipaths that do not fade independently, then the channel element between each transmit-receive antenna pair is a deterministic linear combination of the above deterministic multipaths. This tends to make the channel elements between different transmit-receive antenna pairs correlated.

Antenna Separation

For a given channel multipath, the antenna correlation is inversely proportional to the distance between antennas at the transmitter/receiver. If the antennas are closely spaced, the channel between a first transmit-receive pair is similar to the channel between another transmit-receive pair. This increases antenna correlation.

Preprocessor Implementations

Typically, wireless channels have a few dominant multipaths and many weaker multipaths. Most of the channel energy is concentrated on the dominant multipaths, resulting in antennae correlation. The transmit antenna correlation matrix provides a measure of the degree of correlation between antennas. The preprocessor uses the transmit antenna correlation to improve system performance. First, eigenvectors of the correlation matrix are estimated. The eigenvectors are spatial direction vectors that indicate some linear combination of channel multipaths. The strongest eigenvectors are associated with the dominant multipaths and weakest eigenvectors are associated with the weak multipaths. The processor provides for transmission of the symbol streams on the strongest eigenvectors. For example, if there are B symbol streams, the preprocessor provides for transmission of the symbol streams on the B strongest eigenvectors. By transmitting the symbol streams on the strongest eigenvectors, the preprocessor improves the received SNR of each symbol stream.

The preprocessor includes a preprocessing matrix (F) that is multiplied with a block of incoming symbols. The preprocessor matrix (F) is an M×B matrix, where B is the number of symbol streams and M is the number of transmit antennas. The preprocessor output is X=FS, where S is a B×1 vector containing snapshots of B input symbol streams, and X is a N×1 vector containing snapshots of the preprocessor output. Each element of X is transmitted on a separate transmit antenna. Since the preprocessor provides for transmission of the symbols streams on B strongest eigenvectors, the preprocessor matrix F can be represented with a matrix O, where O is an orthogonal matrix with B columns denoting the eigenvectors of the transmit antenna correlation matrix.

The preprocessor can also scale input symbol streams, depending upon system implementation issues that will be explained below. In other words, the preprocessor matrix F can be equal to O×P, where P is a scaling matrix. The scaling matrix can scale different input symbol streams.

The scaling matrix can be dependent upon several different parameters. Such parameters include a BER/SNR requirement at the receiver, the desired transmission mode, power requirements and code properties.

The scaling matrix dependence can be demonstrated for a preprocessor that provides for transmission of two symbol streams on M transmit antennas, where the two symbol streams are transmitted on the strongest two eigenvectors of the transmit antenna correlation matrix. For example, in the case of scaling matrix dependence upon a BER/SNR requirement at the receiver, if a first symbol stream requires a lower BER than a second symbol stream, then the preprocessor must allocates more power to the first stream (that is, scales it higher) and less power to the second stream (that is, scales it lower).

If a first symbol stream includes a higher transmission order (higher order QAM) than a second symbol stream, the preprocessor can allocate more power to the first stream and less power to the second stream.

Generally, wireless systems are limited by transmission power. The preprocessor can selectively scale the different symbol streams so that power requirements are satisfied at the transmitter.

Additionally, as will be described later, the input symbol streams can be scaled to maximize the minimum distance between coded symbol streams.

Finally, the preprocessor matrix can also include another matrix Q, such that the preprocessing matrix F is set equal to O P Q. The matrix Q can be varied depending upon system implementation issues. For example, the matrix Q can be used to improve the minimum distance between coded input symbol streams.

Typically, the input to the preprocessor has B coded symbol streams. Some instantiations of the coded symbol streams (also known as codewords) are closer to each other, than others. As a result, the receiver can potentially confuse the two codewords if the channel impairments are poor, leading to bit errors. The matrix Q can be chosen so that the distance between the closest code words is maximized. This improves performance, since the receiver has less chances of confusing the codewords.

The minimum distance error matrix is a measure of the distance between two nearest coded symbol stream instantiations (or codewords). The construction and properties of the minimum distance error matrix are well-known in the art of communication systems. The eigenvalues of the minimum distance error matrix indicates the distance measure in each spatial direction (given by the corresponding eigen vector). For example, for B input coded symbol streams, the minimum distance error matrix is a B×B matrix. The B eigenvalues indicate the distance measure on each of the B eigenvectors. Hence, the matrix Q can be chosen to include the B eigenvectors as the columns, each scaled appropriately to maximize the distance measure.

Figure 3:
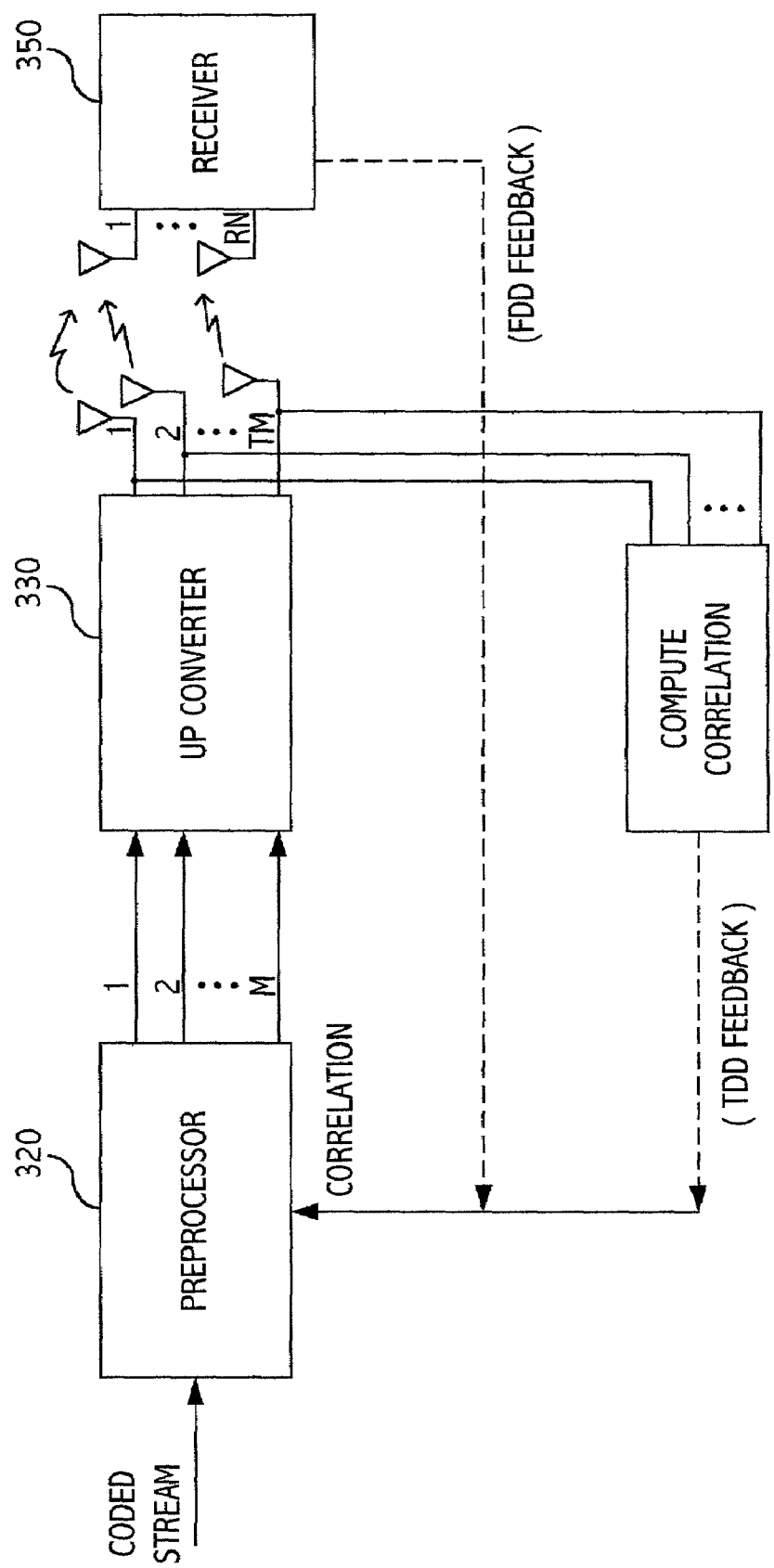
FIG. 3 shows an embodiment of the invention.

A description of an embodiment of a preprocessor that receives a single symbol stream and provides multiple streams for transmission from multiple antennae will be provided. Later, other embodiments of preprocessors that receive multiple (B) symbol streams and that provide multiple streams for transmission from multiple antennae will be described FIG. 3 shows an embodiment of the invention. This embodiment includes a transmitter that includes a preprocessor 310, an upconverter 320 and transmission antennae T1, T2 . . . TM.

The transmitter receives a coded symbol stream that is connected to the preprocessor 310. The preprocessor 320 processes the coded symbol stream. The output of the preprocessor 320 is frequency up converted by the up converter 330 for transmission through the transmission antennae T1, T2 . . . TM. A receiver 350 receives the signals transmitted from the transmission antennae T1, T2 . . . TM through receiver antennae R1 . . . RN.

The coded symbol stream is generated using standard modulation schemes such as QAM, PSK and standard coding schemes such convolution, trellis and block codes. The generation of the coded bit stream is well know in the art of communications.

The up converter 330 receives the precoded and preprocessed symbol streams and modulates a carrier signal for transmission from the M transmission antennae T1, T2 . . . TM. Up converter configurations are well known in the art of communication systems.

The preprocessor 320 preprocesses the coded bit stream. The preprocessing of the preprocessor 320 is generally determined by transmitter antennae correlation information. This embodiment includes the structure of the preprocessor being determined by the largest eigen-vector of a transmitter antennae correlation matrix. The largest eigen-vector determines some linear combination of channel multipaths in which most of the transmission channel energy is concentrated. The preprocessor processes the coded symbol stream so that the symbol steam is transmitted on the strongest eigenvector to ensure an enhanced SNR at the receiver.

Elements of the preprocessing matrix can be scaled depending upon system implementation factors such as transmission power level, SNR or BER requirements. That is, the invention further includes any scaled version of the preprocessing matrix. Additionally, the invention further includes system implementations that include the preprocessing matrix being multiplied by another matrix. An example of this implementation will be described later in which the preprocessing matrix is multiplied by an orthogonal matrix that is dependent upon coding and modulation used within the system.

The antennae correlation information can be determined in several different ways. An embodiment of the invention includes the receiver 350 determining the correlation between transmission antenna pairs, and feeding back the correlation information back to the transmitter. This embodiment is generally used in FDD systems, but can be used in TDD systems. Another embodiment includes the transmitter determining the antennae correlation in a TDD system. In a TDD system, the same transmission channel is used for both downlink and uplink transmission. Therefore, if the transmission channel is relatively static, then uplink signals can be used to characterize the correlation of the M transmission antennae T1, T2 . . . TM.

The embodiment of the transmitter of FIG. 3 receives a single transmit symbol stream. The preprocessor maps the symbol stream on to multiple antennas, which provides improved system performance. The preprocessor includes a preprocessor matrix that is used to generate the multiple output streams. An embodiment includes the preprocessing matrix being generated by first determining the largest eigenvector (V1) from an eigenvalue decomposition of the correlation (transmit antennae correlation) matrix. Next, the preprocessing matrix (F) is generated by multiplying the largest eigenvector with a scalar (alpha). Alpha is a scaling factor that is dependent upon system implementation issues such as BER/SNR requirements, modulation/transmission order and power limitations at the transmitter.

As previously explained, the above example includes one data stream and M transmitter antennae. Other embodiments can include B data streams and M transmitter antennae. The precoder optimally maps the B streams of data onto M (M>=B) antennae to improve system performance.

An embodiment includes the procoder matrix being recomputed only when the receiver feeds back an updated version of the transmit antennae correlations. The precoder only needs to be recomputed if the antennae correlations have changed by a predetermined amount. The predetermined amount can be determined by analyzing system implementation issues.

Figure 4:
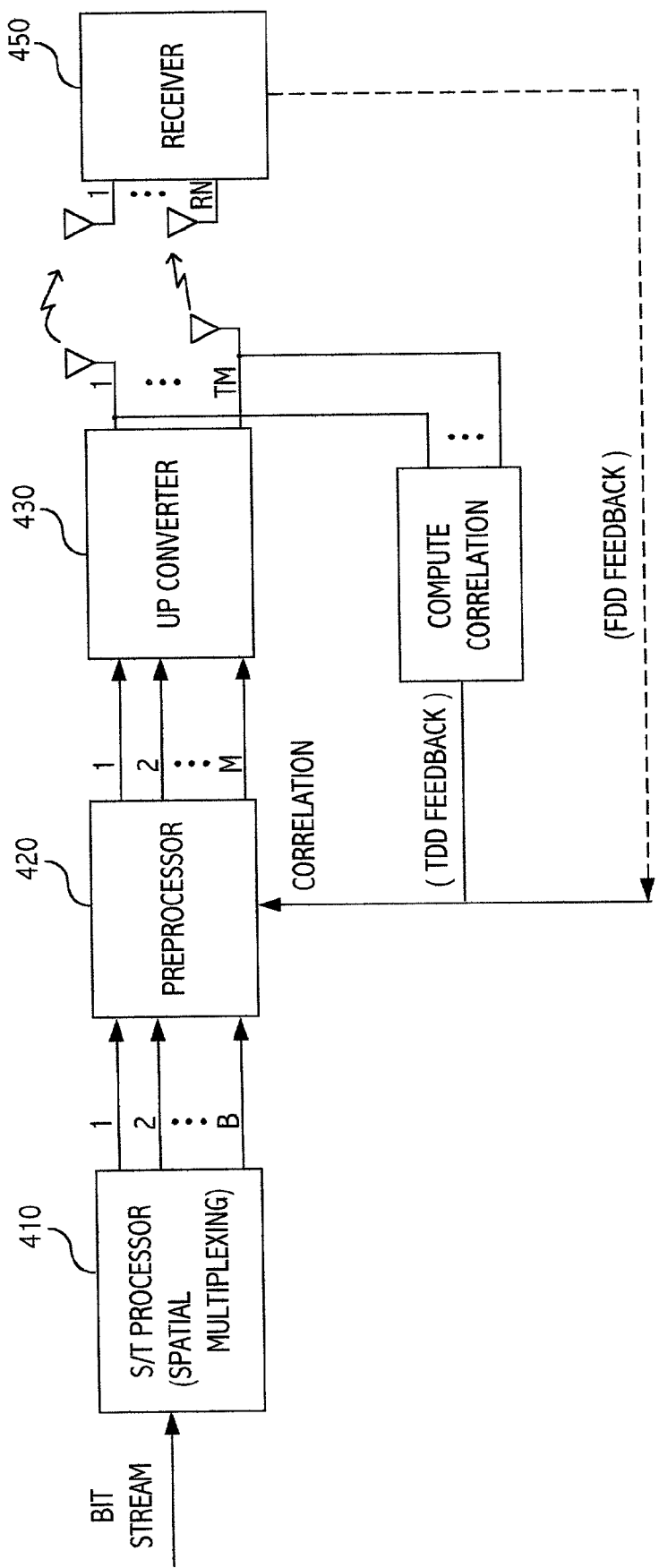
FIG. 4 show another embodiment of the invention that is included within an existing spatial multiplexing transmission system.

FIG. 4 show another embodiment of the invention that is included within an existing spatial multiplexing transmission system. The embodiment of FIG. 4 includes a transmitter that includes a space/time processor 410, a preprocessor 420 and an upconverter 430.

This embodiment includes the transmitter obtaining a transmission antennae correlation matrix from a receiver 450 in a FDD system, or through direct calculation in a TDD system.

The preprocessor 420 receives multiple (B) inputs from the space/time processor 410. The space/time processor 410 can more specifically be a spatial multiplexing processor that generates multiple (B) outputs. This embodiment can be used to improve the system performance of an existing spatial multiplexing system.

An embodiment includes the preprocessing matrix being generated by first calculating the eigenvalue decomposition of the antenna correlation matrix (R), and calculating B eigenvectors. An orthogonal matrix (O) is generated by stacking the B eigenvectors as separate columns of a matrix. A scaling matrix (P) is generated, whose properties are dependent on system implementation issues, such as available transmit power, bit error rate requirement at the receiver, antenna power constraints. Finally, the preprocessing matrix (F) is formed as : F=O*P.

As previously mentioned, the preprocessor processes the B coded symbol streams so that the processes symbol streams are transmitted on the B strongest eigenvectors. The strongest eigenvectors include a linear combination of the channel multipaths having the most energy. The processing improves the SNR of each transmitted symbol stream, thereby improving the performance of the system.

Figure 5:
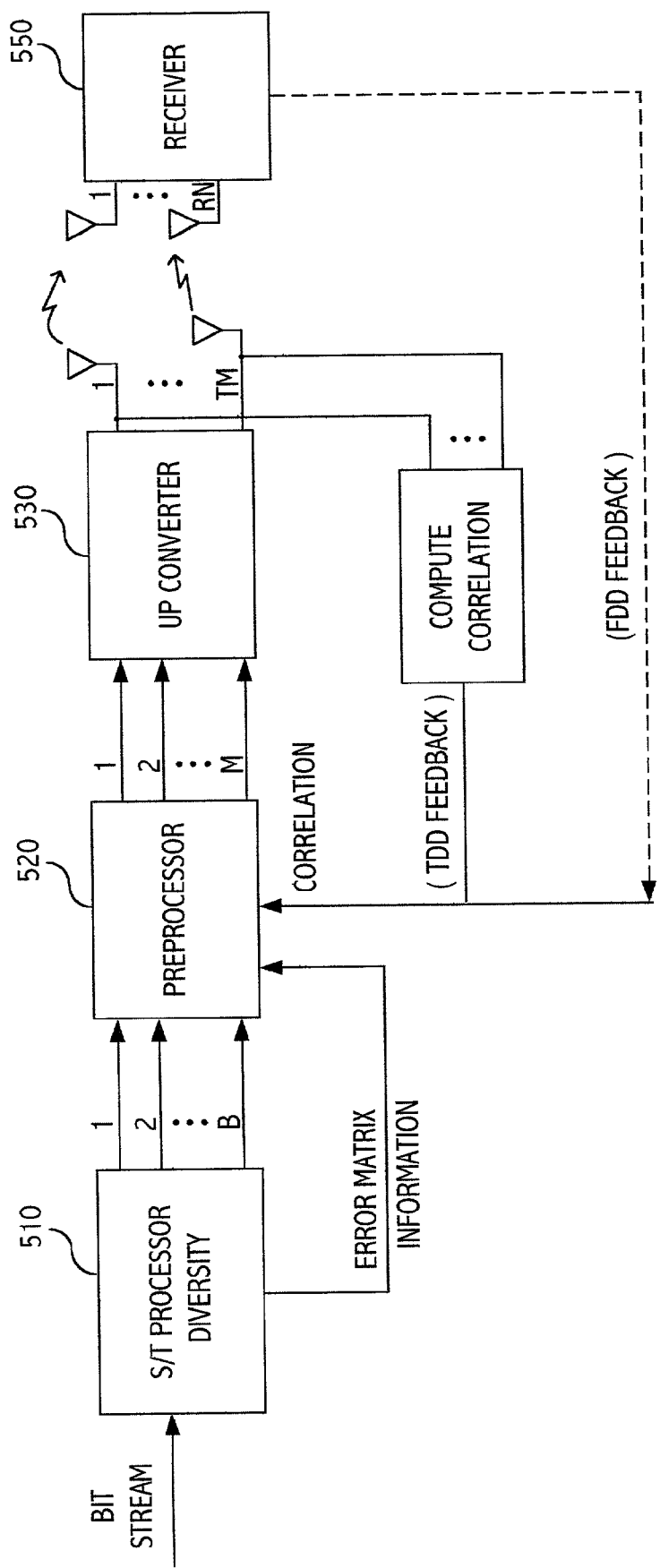
FIG. 5 show another embodiment of the invention that is included within an existing diversity transmission system.

FIG. 5 show another embodiment of the invention that is included within an existing diversity transmission system. The embodiment of FIG. 5 includes a transmitter that includes a space/time processor 510, a preprocessor 520 and an upconverter 530.

This embodiment includes the transmitter obtaining a transmission antennae correlation matrix from a receiver 550 in a FDD system, or through direct calculation in a TDD system.

The preprocessor 520 receives multiple (B) inputs from the space/time processor 510. The space/time processor 510 can more specifically be a transmission diversity processor that generates multiple (B) outputs. This embodiment can be included within an existing transmit diversity scheme that generates B symbol streams. In such systems, the preprocessor can be used to further improve system performance.

The preprocessor matrix can be generated by first calculating the eigenvalue decomposition of the antenna correlation matrix (R ), and calculating the B eigen vectors [V1, V2, . . . , VB]. An orthogonal matrix (O) is generated by stacking the B eigenvectors as separate columns of a matrix (that is, O=[V1 V2 . . . VB]). An eigenvalue decomposition of the minimum distance error matrix (D) is performed, to generate another set of B eigen vectors [U1, U2, . . . UB]. These eigenvectors are different from the eigenvectors generated previously. As previously mentioned, the minimum distance error matix includes a measurement of the distance between the two nearest coded symbol stream instantiations (or codewords). The eigenvalues of the minimum distance error matrix indicates the measurement of the distance in each spatial direction (as provided by a corresponding eigenvector). Minimum distance error matrices are a well-known property of existing transmit diversity schemes.

A second orthogonal matrix (O_error) is generated by stacking the B eigenvectors as separate columns of a matrix (that is, O_error=[U1 U2 . . . UB]). A scaling matrix (P) is generated based upon system implementation issues, such as available transmit power, BER/SNR requirements, modulation order and the minimum distance error matrix. Finally, the precoder matrix (F) is calculated as: F=O*P*O_error.

The preprocessor provides for transmission of the B coded symbol streams over the B strongest eigenvectors of the antennae correlation matrix improving the SNR of the transmitted symbol streams. Additionally, the preprocessor improves (increases) the minimum distance between the input codewords, thereby improving system performance.

Orthogonal Frequency Division Multiplexing (OFDM) Modulation

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 6:
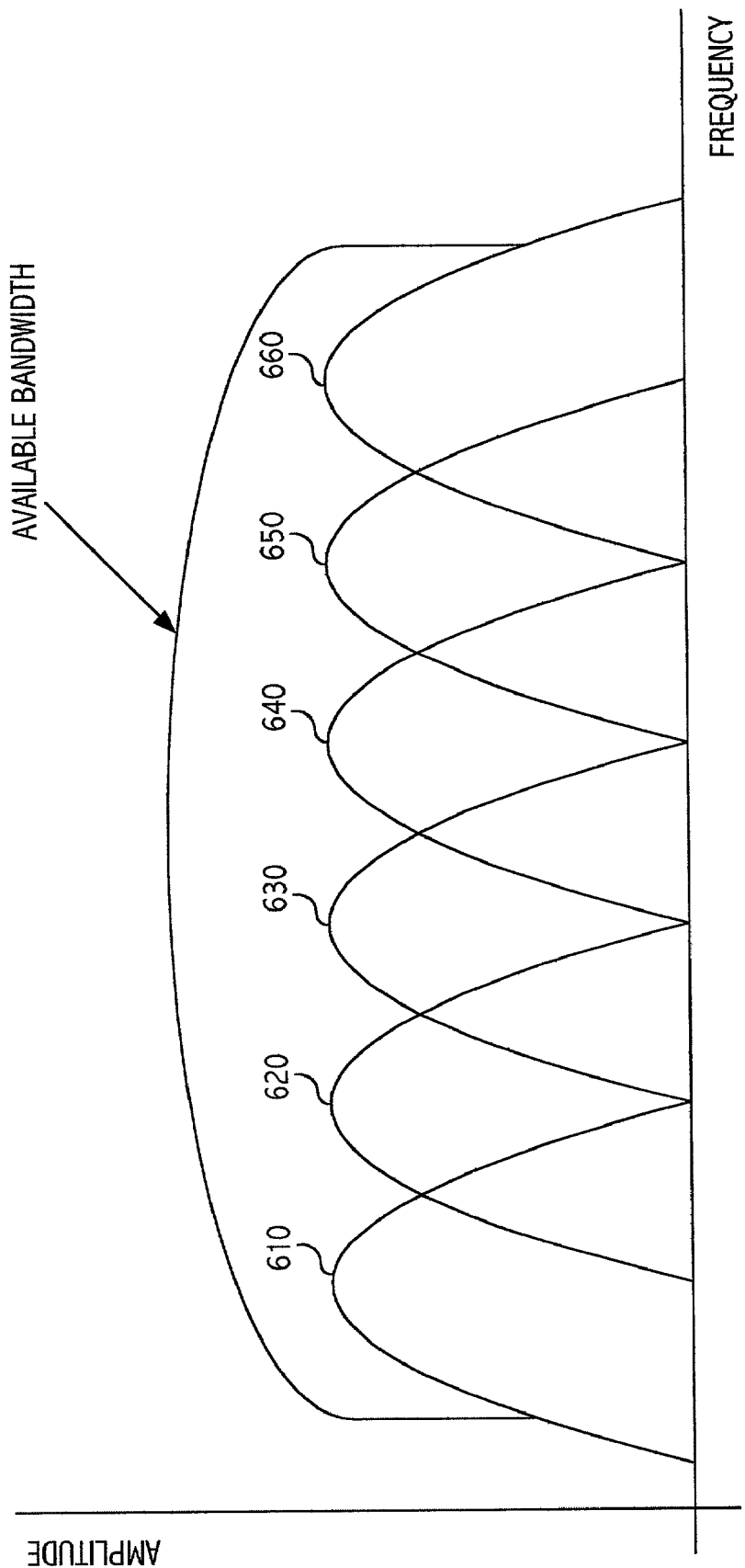
FIG. 6 shows a frequency spectrum of orthogonal frequency division multiplexing (OFDM) sub-carrier signals.

FIG. 6 shows a frequency spectrum of OFDM sub-carrier signals 610, 620, 630, 640, 650, 660. Each sub-carrier 610, 620, 630, 640, 650, 660 is modulated by a separate linear combination of incoming symbols.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the symbol stream to look periodic. Additional symbols (for example 100) are transmitted for the cyclic prefix or cyclic suffix. For each symbol period a total of 1124 symbols are transmitted, by only 1024 unique QAM symbols per burst. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Figure 7:
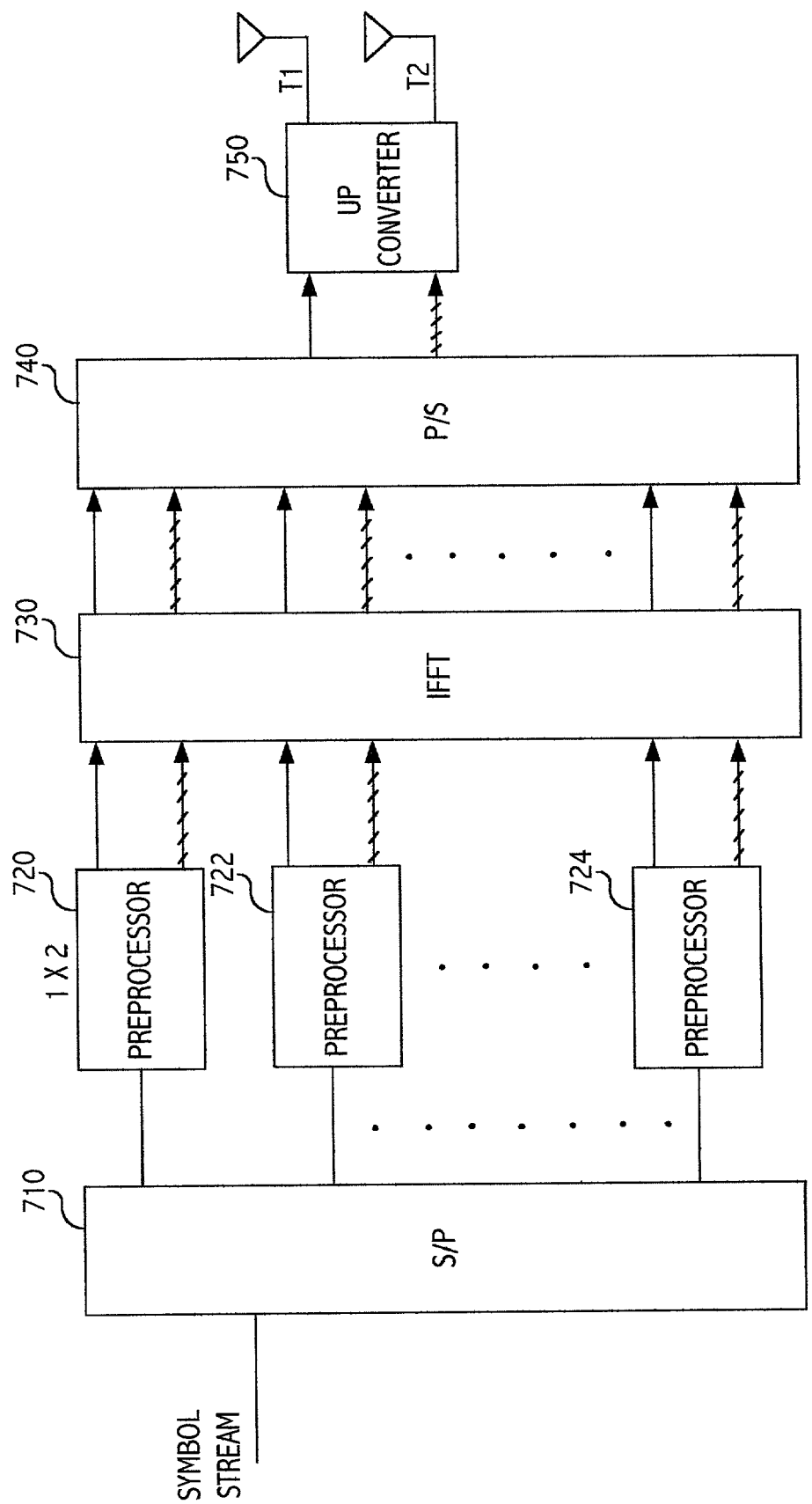
FIG. 7 shows an embodiment of the invention including OFDM.

FIG. 7 shows an embodiment of the invention including OFDM. A serial to parallel (S/P) converter 710 receives a symbol stream and generates multiple parallel streams of symbols. The number of parallel symbol streams generated is dependent upon the OFDM system. The above described system includes 1024 parallel streams. This embodiment further includes multiple preprocessors 720, 722, 724. A corresponding preprocessor 720, 722, 724 receives each generated parallel symbol steam. Each preprocessor 720, 722, 724 generates multiple processed outputs. The number of processed outputs is equal to the number of transmit antennae. An inverse fast fourier transform (IFFT) 730 receives the processed outputs and in conjunction with a parallel to serial (P/S) converter 740 generated OFDM signals that are upconverted through an upconverter 750, and transmitted through transmission antennae T1, T2.

The preprocessor 720, 722, 724 each receive a correlation matrix R. This can include each preprocessor 720, 722, 724 receiving a common correlation matrix R, or each individual preprocessor 720, 722, 724 receiving a unique correlation matrix R. That is, a common correlation matrix can exist across all OFDM tones, or the correlation matrix R can vary as a function of the OFDM tones. Additionally, a separate preprocessor 720, 722, 724 can exists for each tone, or the preprocessors can be combined and incorporated into a common master preprocessor.

The embodiment of the invention including OFDM of FIG. 7 is an implementation of the embodiment shown in FIG. 3 that receives a single symbol stream. It is to be understood that similar OFDM implementations of the embodiments shown in FIG. 4 and FIG. 5 are also covered by the invention.

Figure 8:
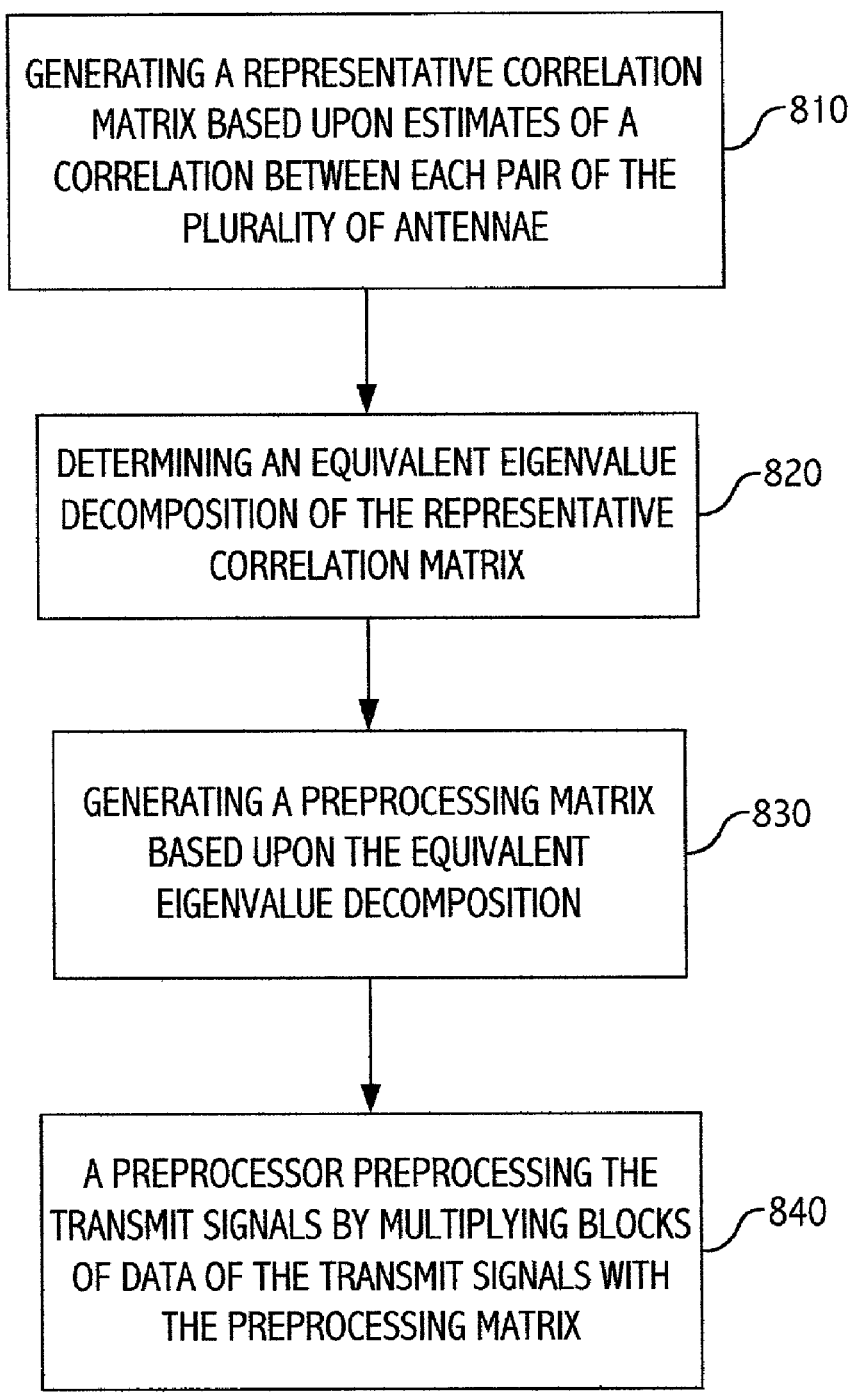
FIG. 8 shows a flow chart of steps or acts included within an embodiment of the invention.

FIG. 8 shows a flow chart of steps or acts included within an embodiment of the invention.

A first step 810 includes generating a representative correlation matrix based upon estimates of a correlation between each pair of the plurality of antennae.

A second step 820 includes determining an equivalent eigenvalue decomposition of the representative correlation matrix.

A third step 830 includes generating a preprocessing matrix based upon the equivalent eigenvalue decomposition. This step can further include generating an eigenvector from the representative correlation matrix. The preprocessing matrix can be generated by multiplying the eigenvector with a scaler.

A fourth step 840 includes a preprocessor preprocessing the transmit signals by multiplying blocks of data of the transmit signals with the preprocessing matrix.

Figure 9:
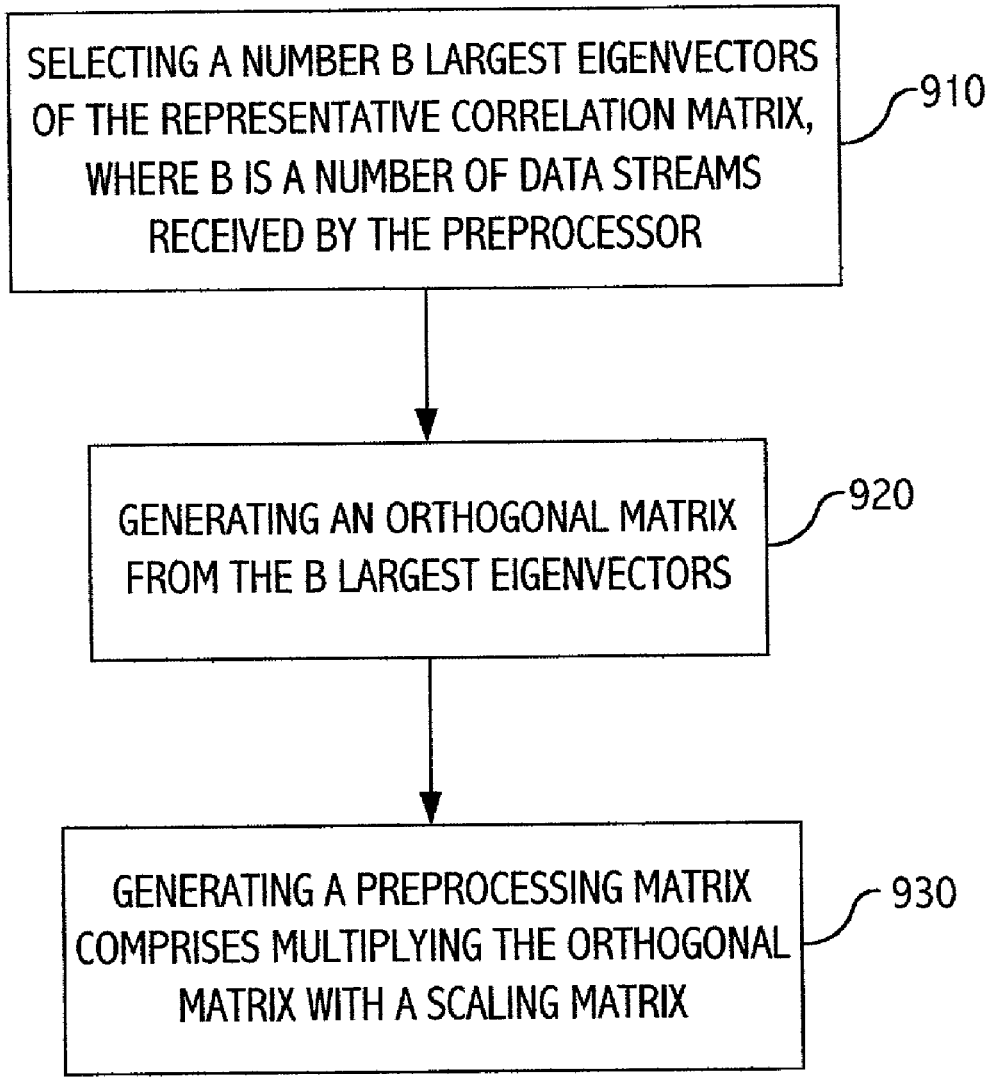
FIG. 9 shows a flow chart of steps or acts of an embodiment of the invention that is included within an existing spatial multiplexing transmission system.

FIG. 9 shows a flow chart of steps or acts of an embodiment of the invention that is included within an existing spatial multiplexing transmission system.

A first step 910 includes selecting a number B largest eigenvectors of the representative correlation matrix, where B is a number of data streams received by the preprocessor.

A second step 920 includes generating an orthogonal matrix from the B largest eigenvectors.

A third step 930 includes generating a preprocessing matrix comprises multiplying the orthogonal matrix with a scaling matrix.

The data streams received by the preprocessor can be generated by a space/time processor. More specifically, the data streams received by the preprocessor can be generated by a spatial multiplexing preprocessor.

Figure 10:
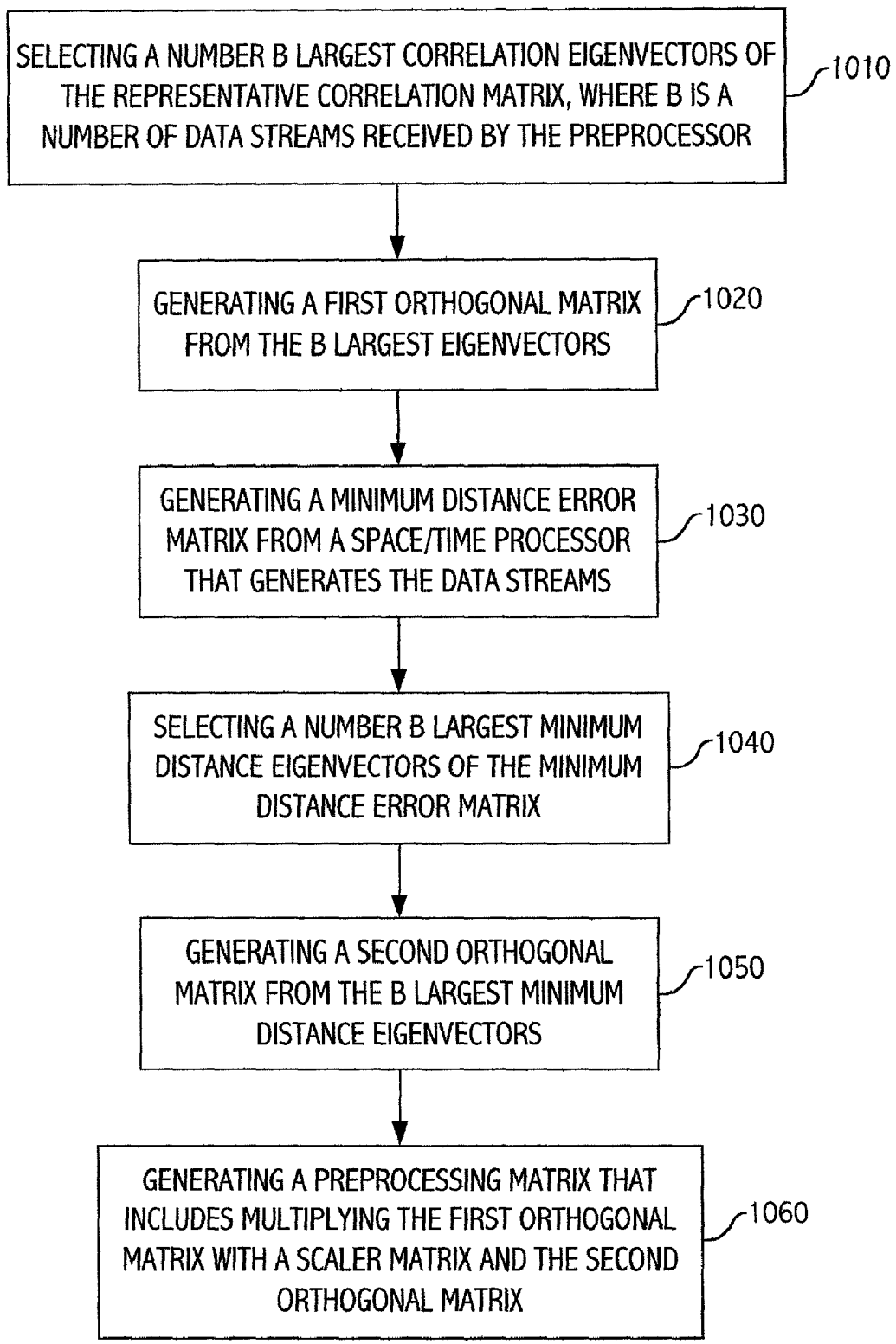
FIG. 10 shows a flow chart of steps or acts of an embodiment of the invention that is included within an existing diversity transmission system.

FIG. 10 shows a flow chart of steps or acts of an embodiment of the invention that is included within an existing diversity transmission system.

A first step 1010 includes selecting a number B largest correlation eigenvectors of the representative correlation matrix, where B is a number of data streams received by the preprocessor.

A second step 1020 includes generating a first orthogonal matrix from the B largest eigenvectors.

A third step 1030 includes generating a minimum distance error matrix from a space/time processor that generates the data streams.

A fourth step 1040 includes selecting a number B largest minimum distance eigenvectors of the minimum distance error matrix.

A fifth step 1050 includes generating a second orthogonal matrix from the B largest minimum distance eigenvectors.

A sixth step 1060 includes generating a preprocessing matrix that includes multiplying the first orthogonal matrix with a scaler matrix and the second orthogonal matrix.

The data streams received by the preprocessor can be generated by a space/time processor. More specifically, the data streams received by the preprocessor can be generated by a diversity transmission preprocessor.

Although specific embodiments of the invention have been described and illustrated, the invention is not to be limited to the specific forms or arrangements of parts so described and illustrated. The invention is limited only by the claims.

What is claimed is:

1. A method of preprocessing transmit signals of a transmitter having a plurality of antennae, the method comprising:
   generating a representative correlation matrix based upon estimates of a correlation between each pair of the plurality of antennae;
   determining an equivalent eigenvalue decomposition of the representative correlation matrix;
   generating a preprocessing matrix based upon the equivalent eigenvalue decomposition; and
   preprocessing the transmit signals by multiplying blocks of data of the transmit signals with the preprocessing matrix, the preprocessing including selecting a number B largest eigenvectors of the representative correlation matrix, where B is a number of data streams received by a preprocessor, generating an orthogonal matrix from the B largest eigenvectors, and multiplying the orthogonal matrix with a scaling matrix to generate the preprocessing matrix.

2. The method of preprocessing signals of claim 1, wherein the representative correlation matrix is based upon a mean estimate of a channel matrix that represents a transmission channel between the plurality of antennae and a receiver.

3. The method of preprocessing signals of claim 1, wherein the representative correlation matrix is based upon a covariance estimate of a channel matrix that represents a transmission channel between the plurality of antennae and a receiver.

4. The method of preprocessing signals of claim 1, further comprising:
   generating an eigenvector from the representative correlation matrix.

5. The method of preprocessing signals of claim 1, wherein the data steams received by the preprocessor are generated by a space/time processor.

6. The method of preprocessing signals of claim 5, wherein the space/time processor provides spatial multiplexing.

7. The method of preprocessing signals of claim 1, further comprising:
   generating a first orthogonal matrix from the B largest eigenvectors;
   generating a minimum distance error matrix from a space/time processor that generates the data streams;
   selecting a number B largest minimum distance eigenvectors of the minimum distance error matrix;
   generating a second orthogonal matrix from the B largest minimum distance eigenvectors; and wherein
   generating a preprocessing matrix comprises multiplying the first orthogonal matrix with a scaler matrix and the second orthogonal matrix.

8. The method of preprocessing signals of claim 7, wherein the data streams received by the preprocessor are generated by a space/time processor.

9. The method of preprocessing signals of claim 8, wherein the space/time processor that generates the data streams provides transmission diversity.

10. The method of preprocessing signals of claim 1, wherein the representative correlation matrix is an exact estimate of the correlation between each pair of the multiple antennae.

11. The method of preprocessing signals of claim 1, wherein the representative correlation matrix is generated by a receiver that receives the preprocessed transmit signals.

12. The method of preprocessing signals of claim 1, wherein the representative correlation matrix is generated by a transmitter that transmits the preprocessed transmit signals.

13. The method of preprocessing signals of claim 1, wherein the preprocessed transmit signals are modulated with a multi-carrier modulator.

14. The method of preprocessing signals of claim 13, wherein the multi-carrier modulator comprises an orthogonal frequency division multiplexer.

15. The method of preprocessing signals of claim 13, further comprising a plurality of preprocessors, wherein a preprocessor corresponds with at least one of each of a plurality carrier signals of the multi-carrier modulator.

16. The method of preprocessing signals of claim 15, wherein each preprocessing matrix of each of the plurality of preprocessors is based upon a correlation matrix between each pair of the plurality of antennae at a frequency of the corresponding carrier signal.

17. The method of preprocessing signals of claim 1, wherein the transmit signals are formatted according to at least one of the following multiple access schemes: time division multiple access (TDMA), frequency division multiple access (FDMA), code division multiple access (CDMA), orthogonal frequency division multiple access (OFDMA) and wavelet division multiple access.

18. A system for preprocessing signals to be transmitted from a transmitter having multiple antennae, to a receiver for receiving the preprocessed signals, comprising:
    means for generating a representative correlation matrix based upon estimates of a correlation between signal transmitted from each pair of the multiple antennae;
    means to determine an equivalent eigenvalue decomposition of the representative correlation matrix;
    means to generate a preprocessing matrix based upon the equivalent eigenvalue decomposition, said generating means to select a number B largest eigenvectors of the representative conelation matrix, where B is a number of received data streams, to generate an orthoaonal matrix from the B largest eigenvectors, and to multiply the orthogonal matrix with a scaling matrix to generate the preprocessing matrix; and
    a preprocessor for preprocessing the transmit signals by multiplying blocks of data of the transmit signals with the preprocessing matrix.

19. The system for preprocessing signals of claim 18, wherein the receiver comprises a post-processor that comprises at least one of a maximum likelihood receiver, a beam former, an minimum mean square error receiver, a zero forcing receiver.

20. The system for preprocessing signals of claim 18, further comprising multiple preprocessors in which a preprocessor is selected based upon the preprocessing matrix.

21. A system for preprocessing signals to be transmitted from a plurality of transmitters, each transmitter having at least one transmit antenna, to a receiver, comprising:
    means to generate a representative correlation matrix based upon estimates of a correlation between signal transmitted from each pair of transmitter antennae;
    means to determine an equivalent eigenvalue decomposition of the representative correlation matrix;
    means to generate a preprocessing matrix based upon the equivalent eigenvalue decomposition, said generating means to select a number B largest eigenvectors of the representative correlation matrix, where B is a number of received data streams, to generate an orthogonal matrix from the B largest eigenvectors, and to multiply the orthogonal matrix with a scaling matrix to generate the preprocessing matrix; and
    a preprocessor within each transmitter to multiply to multiply the blocks of data of the transmit signals with the preprocessing matrix.

22. A method of preprocessing transmit signals of a transmitter, the method comprising:
    generating a representative correlation matrix based upon estimates of a correlation between each pair of the plurality of antennae;
    generating a preprocessing matrix based upon the representative correlation matrix by selecting a number B largest eigenvectors of the representative correlation matrix, where B is a number of received data streams, generating an orthogonal matrix from the B largest eigenvectors, and multiplying the orthogonal matrix with a scaling matrix to generate the preprocessing matrix; and
    a preprocessor preprocessing the transmit signals by multiplying blocks of data of the transmit signals with the preprocessing matrix.

23. The method for preprocessing signals of claim 22, further comprising:
    determining an equivalent eigenvalue decomposition of the representative correlation matrix; and
    generating the preprocessing matrix based upon the equivalent eigenvalue decomposition.

24. The method of preprocessing signals of claim 23, further comprising:
    generating an eigenvector from the representative correlation matrix.

25. An apparatus comprising:
    a plurality of anntennae through which the apparatus can transmit signal(s); and
    a pre-processor, to generate a preprocessing matrix based, at least in part, upon an equivalent eigenvalue decomposition of a representative correlation matrix between each pair of the plurality of antennae, to select a number B largest eigenvectors of the representative correlation matrix, where B is a number of received data streams, to generate an orthogonal matrix from the B largest eigenvectors, and to multiply the orthoaonal matrix with a scaling matrix to generate the preprocessing matrix, and to process content of one or more received coded signal stream(s) by multiplying the content with the preprocessing matrix to generate one or more signal(s) for transmission via at least a subset of the plurality of antennae.

* * * * *